US009596866B2

(12) United States Patent
Garcia Martinez

(10) Patent No.: US 9,596,866 B2
(45) Date of Patent: Mar. 21, 2017

(54) SHIRRING COMPOSITION AND APPLICATIONS THEREOF

(75) Inventor: Ion Inaki Garcia Martinez, Tajonar (ES)

(73) Assignee: VISCOFAN, S.A., Tajonar (Navarra) (ES)

( * ) Notice: Subject to any disclaimer, the term of this patent is extended or adjusted under 35 U.S.C. 154(b) by 298 days.

(21) Appl. No.: 14/241,208

(22) PCT Filed: Aug. 23, 2012

(86) PCT No.: PCT/ES2012/070633
§ 371 (c)(1),
(2), (4) Date: May 1, 2014

(87) PCT Pub. No.: WO2013/030424
PCT Pub. Date: Mar. 7, 2013

(65) Prior Publication Data
US 2014/0314915 A1    Oct. 23, 2014

(30) Foreign Application Priority Data

Aug. 26, 2011 (ES) .................................. 201131422

(51) Int. Cl.
*A22C 13/00* (2006.01)
*A22C 13/02* (2006.01)
(52) U.S. Cl.
CPC .......... *A22C 13/0013* (2013.01); *A22C 13/02* (2013.01); *Y10T 428/1324* (2015.01)

(58) Field of Classification Search
CPC ................ A22C 13/0013; A22C 13/02; Y10T 428/1324
See application file for complete search history.

(56) References Cited

U.S. PATENT DOCUMENTS

| 2,105,273 A | 1/1938 | Smith |
| 3,158,488 A | 11/1964 | Firth |
| 3,378,379 A | 4/1968 | Shiner et al. |

(Continued)

FOREIGN PATENT DOCUMENTS

| CA | 1325131 | 12/1993 |
| EP | 1101406 | 5/2001 |

(Continued)

OTHER PUBLICATIONS

International Search Report dated Dec. 21, 2012, from the corresponding PCT/ES2012/070633.

(Continued)

*Primary Examiner* — Anthony Weier
(74) *Attorney, Agent, or Firm* — Katten Muchin Rosenman LLP

(57) ABSTRACT

The present invention relates to a composition for shirring artificial casings which allows conferring the casing with a high capacity to cling to the meat paste stuffed therein. The composition of the invention includes at least one heat curable polycationic resinous component, a polyolic component and water, wherein the water activity (aw) index has a value greater than or equal to 0.70. A casing impregnated by said composition, the meat product stuffed in said casing and the method for impregnating the casing with the composition of the invention is also contemplated.

26 Claims, 2 Drawing Sheets

(56) References Cited

U.S. PATENT DOCUMENTS

| | | | |
|---|---|---|---|
| 3,898,348 | A | 8/1975 | Chiu et al. |
| 3,917,894 | A * | 11/1975 | Coleman .............. A22C 13/0013 427/381 |
| 3,935,320 | A | 1/1976 | Chiu et al. |
| 3,981,046 | A | 9/1976 | Chiu |
| 4,207,353 | A | 6/1980 | Rasmussen et al. |
| 4,303,711 | A | 12/1981 | Erk et al. |
| 5,928,738 | A | 7/1999 | Auf Der Heide et al. |
| 5,972,691 | A | 10/1999 | Bates et al. |
| 6,395,356 | B1 | 5/2002 | Wielockx et al. |
| 7,833,594 | B2 | 11/2010 | Cruz |
| 2001/0045236 | A1 | 11/2001 | Verschueren et al. |
| 2004/0062888 | A1 | 4/2004 | Cruz |
| 2006/0188615 | A1* | 8/2006 | Wilfer ................ A22C 13/0013 426/138 |
| 2009/0075575 | A1* | 3/2009 | Tallberg ............. A22C 13/0003 452/21 |
| 2010/0003376 | A1 | 1/2010 | Blumenberg et al. |

FOREIGN PATENT DOCUMENTS

| | | |
|---|---|---|
| ES | 2076904 | 11/1995 |
| WO | 96/40967 | 12/1996 |
| WO | 2005/092108 | 10/2005 |

OTHER PUBLICATIONS

European Search Report dated Dec. 16, 2014, from the corresponding EP Application No. 12829001.2.

Marcolli C, Peter Th: "Water activity in polyol/water systems: new UNIFAC parameterization", Atmospheric Chemistry and Physics, vol. 5, No. 6, Jun. 17, 2005 (Jun. 17, 2005), pp. 1545-1555, XP002733055, DOI: 10.5194/ acp-5-1545-2005 Retrieved from the Internet: URL: http://www.atmos-chem-phys.net/5/1545/2005/acp-5-1545-2005.pdf [retrieved on Nov. 26, 2014] *the whole document*.

* cited by examiner

SHIRRING COMPOSITION AND APPLICATIONS THEREOF

FIELD OF THE INVENTION

The present invention is encompassed within the field of the meat industry, more specifically, in the sector of artificial coverings for stuffed products. In particular, it relates to a composition for use during the shirring of artificial casings for stuffed products, which allows conferring the casing a high capacity to cling to the meat paste stuffed therein. Likewise, the present invention relates to the casing impregnated with said shirring composition, to the meat product wrapped with said casing and to the method for impregnating said casing with the composition of the invention.

BACKGROUND OF THE INVENTION

Casings for stuffed products allow a high degree of specialization in relation with the intended applications. Said specialization combines various properties (mechanical properties, gas and/or liquid barrier/permeability properties, cling properties, biological properties, organoleptic properties, etc.) concerning the successive processes and uses to which the casing will be subjected throughout its journey in the market, from the meat industry where it is stuffed to the end consumer. All the properties of a casing render it with a predetermined function in each of the steps of said journey.

A particular combination of properties depends in turn on the material composition and the construction structure of the casing, on the physicochemical treatments to which the casing has been subjected during manufacture, as well as on the incorporation of secondary elements which provide additional properties or modulate the existing ones. These elements generally consist of coatings for coating the inner and/or outer walls of the casing made with substances or compositions different from those of the material making up same.

One of the specializations to which the coatings are intended and which is the object of the present invention is the specialization which emphasizes the cling capacity exerted by some artificial casings on the meat surface which they wrap. When a stuffed product must be subjected to subsequent cooking and/or air curing processes, it is very convenient that the casing does not separate from the meat, since the formation of fat or gelatin bags (in the case of a cooking process) or the formation of air bags as the meat contracts during drying is thus prevented, since in addition to being unsightly they can enhance unwanted fungal growth. It is also important to prevent the skin from separating from the meat when the stuffed product is sliced for consumption.

Until now, coatings used for improving the cellulose casing cling to meat are formed by compositions involving soluble proteins, alone or in combination with acetylated monoglycerides, or chemically modified proteins, in the compositions of which there may or may not be included aldehyde crosslinkers or other carbonyl rich compounds such as liquid smoke. Other substances which provide clinging are chitosan, polyvinyl acetates and some co-polymers thereof and heat curable (also known as thermo-setting) polycationic resins; the technique has identified polycationic resins as one of the more effective substances.

Once applied in liquid state, the heat curable polycationic resins used in tubular food films as a surface coating must be subjected to a heating period to harden them and fix them to the surface. This hardening is due to the crosslinking processes resulting from heat-activated intermolecular chemical binding reactions. The polyamino-polyamide-epichlorohydrin resins (epichlorohydrin, epifluorohydrin, epibromohydrin and epiiodohidrin) contain active functional groups reacting with the amine, hydroxyl, carboxyl and thiol groups when heated.

The amounts of resin commonly applied as a coating on the inner surface of the casings are of the order of 0.4 mg/dm2 to 4.8 mg/dm2 (US2010003376A1).

Some classes of casing, for example, reinforced (fibrous) or non-reinforced cellulose casing have, once its production ends, a solid inner coating of cured resin which is anchored to the surface of the casing by means of the same heat curing process of the resin (U.S. Pat. No. 3,378,379). In other words, the cellulose-resin interphase is bridged by chemical bonds while at the same time the resinous phase is entirely crosslinked acquiring a great inner cohesion.

The resin coating acts as a link between the cellulose, to which it is anchored in the curing or crosslinking step, and the meat, to which it clings after stuffing. Even in those occasions in which the resinous cling coating incorporates other substances with cling modulating effect or agents favoring easy peeling (WO 2005/092108 A1), the resin must always be fixed to the casing.

The common method for applying inner cling coating has been determined by the resin curing process. Since the process for manufacturing a cellulose casing always involves a step of drying by means of high temperature hot air, the application of a liquid coating of heat curable polycationic resin is commonly performed in the step before drying, in order to take advantage of:

a) the heat from the drying to start resin curing;
b) the reduction of casing moisture to levels less than 10% to favor the reaction of the resin with the casing and
c) the cellulose tube inflation with air which takes place as it passes through the dryer, since the resin thus creates a cured single-layer of coating which will not stick (blocking effect) to itself when the casing is collapsed again before winding into reels.

However, this has a serious drawback since the common method for applying inner coatings known in the field as "the bubble" or "slugging" (U.S. Pat. Nos. 3,158,488 or 3,378,379) requires periodically breaking the casing and therefore the process continuity in order to replace the consumed resin in the bubble. Said action is associated with the corresponding economical cost in terms of space, equipment, manpower and efficiency.

In fact, in this "bubble" method:

a) an incision or a cut is made on the casing to enable accessing its interior.
b) a specific volume of coating solution is added into the casing through the opening made. The volume cannot be too large and cause too big a bubble because it becomes unmanageable.
c) the cut ends of the casing are connected again, for example, by means of rubber tubes to restore casing continuity again.
d) the casing is passed between a pair of rollers, such that a layer ("coating") having a specific thickness is passed through, producing a specific amount of coating.
e) When the entire volume of solution of the bubble has been consumed (or before, if having a more regular process is desired), it is necessary to restart the process.

Furthermore, it must be highlighted that, while the internal volume of the casing increases in quadratic proportion with respect to the caliber, the inner surface only increases in linear proportion with respect to the caliber. The Surface/

Volume ratio is therefore inversely proportional to the caliber, which means that it increases in a hyperbolic manner as the caliber drops.

For example, a volume V1 is necessary to coat the 100-meter inner surface of a Caliber 50 casing. That volume V1, introduced inside the Caliber 50 casing, involves bubble height (being conventionally considered as vertical, although the considerations would be similar for a bubble with any other orientation) of h1.

To coat the 100-meter inner surface of a Caliber 10 casing (with an amount of coating per surface similar to that of the preceding case of caliber 50), it is easy to demonstrate that the height of bubble must be 5×h1, i.e., 5 times greater than the preceding case.

The practical reasons dictate that the length of bubble must be limited since, for example, maintaining a casing with a column of many meters of liquid therein in movement would be unmanageable. The previous calculations show that low caliber casings need relatively greater bubble heights than the high calibers for producing a similar length of coating. Therefore, if desired, maintaining a maximum bubble height h1, both in the Caliber 50 casing and the Caliber 10 casing, will involve replacing the bubble 5 times more frequently in the Caliber 10 than in the Caliber 50, with all the subsequent processes (cutting, filling, slicing . . . ) it entails. This adds unacceptable operation costs the smaller the caliber is (and, therefore, generally, its market price), meaning that high cling casings below Caliber 36 are not commercially found. Therefore, while the "bubble" method is widely used in high caliber fibrous casings (reinforced cellulose casings), its application to low calibers is virtually nil ("low calibers" being understood as all those with a diameter less than 36 mm).

Therefore, there is a need in the state of the art to obtain small caliber casings with high cling characteristics to meat emulsion in an economical manner.

An alternative to the inner or outer resin coating in fibrous cellulose casings has been the direct incorporation of the resin into the viscose solution before extrusion in the corresponding coagulant baths. The resin solution is injected into the viscose circuit (US 2001/0045236 A1). Later on, during the casing drying process, the high temperatures of the dryer activate resin crosslinking.

The meat emulsion cling effect occurs mainly between said meat emulsion and the inner surface of the casing. In the case of reinforced cellulose casings in which a fibrous substrate is covered with viscose on their outer and/or inner face, the addition of resin to the viscose can be limited to the viscose used for coating the inner surface of the casing (U.S. Pat. Nos. 2,105,273, 6,395,356) which involves an optimum utilization of the resin. However, in the case of non-reinforced cellulose casings generally intended for much lower calibers than the fibrous ones, viscose tends to make up the entire thickness of the cellulose casing. The addition of the resin to the viscose will finally distribute the resin throughout the thickness of the casing and not only on the inner surface which is where it would be interested to obtain the desired meat emulsion cling effect. This means that the added amount of resin is much greater than that necessary for merely obtaining the coating in the inner layer, which involves extra expenses. Furthermore, the presence of resin in the thickness of the casing can have additional negative effects on the casing, for example, mechanical resistance variation undesirably modifying the end physical properties of the film.

Therefore, there is a need in the state of the art to develop alternative, economical and efficient techniques for obtaining casings with a high degree of meat cling, in particular casings of low caliber, for the purpose of overcoming the difficulties and drawbacks derived from the current bubble and viscose techniques commonly used for applying additives, providing the casing meat cling effect but without modifying the rest of the process leading to the manufacture of finish casing for the purpose of not introducing technological risks nor new elements of cost.

Finish casing or tube manufacture is a continuous process that finishes with winding same. The finish and inflated cellulose tube continuously exiting the dryer, is collapsed by means of tamping rollers, thus evacuating air from its interior. A flattened tube in the form of a continuous flat belt is thus obtained, the tube is wound on a plastic or cardboard mandrel forming reels, accumulating a predetermined length of casing, until the reel acquires dimensions suitable for subsequent handling. The casing continuity is interrupted when the reel is separated from the process, being replaced with a new mandrel on which the winding of the next reel will continue.

The reels become a stock awaiting its access to a subsequent off-line process for converting the flat casing flat into sticks of shirred casing which is also "casing shirring".

During the shirring process, the flat casing is first restored to its tubular shape to be longitudinally jacketed on a straight sleeve, along which it slides at great speed with the aid of a series of drive rollers, while it is sprayed with an aqueous dispersion or aqueous emulsion made up of one or several ingredients acting primarily as lubricant and plasticizer, as is well known in the art.

The rollers press on the outer wall of the casing while the inner face thereof rests on the polished metal sleeve. The disposition and geometry of the rollers creates a drive ring around the casing. When the rollers rotate, they drag the casing in the direction of rotation and in the direction of the axis of the sleeve (although the axis of rotation of the rollers is not exactly perpendicular to that of the casing-sleeve assembly). The simultaneous rotation of the rollers on the outer face of the casing creates enough driving force both for unwinding and dragging the casing to the inlet thereof, and for folding and compressing it at the same time against a braking device at the outlet thereof. Therefore it is possible to accumulate quite a few meters of casing in the shape of a straight and rigid folded tube (due to the heavy compaction of the folds therebetween) which has several centimeters of length and which is known as a stick in the field.

The additives sprayed on the cellulose casing during shirring have two main purposes: a) on one hand to lubricated the contact interphase between the inner face of the casing and the surface of the sleeve so that the sliding of the casing on same occurs with minimum friction; and b) on the other hand it has the purpose of preparing the casing to prevent any damage during folding and compaction. The additives added for this purpose in the shirring process can include, for example, plasticizer substances, such as glycerol, propylene glycol or other polyols, which also perform the function of delaying water intake by the cellulose casing given its high hygroscopicity (U.S. Pat. Nos. 3,898,348; 3,981,046).

Subsequently these additives can be combined with other additives the functionality of which is different. They can, for example, be combined with flavoring and coloring substances which are transferred to the meat, such as liquid smoke (CA 1325131), or such as a bixin colorant composition, as disclosed in patent ES2076904 A1 which also combine various water or alcohol soluble film-forming agents or mixtures of both such as cellulose esters, zein, casein, dextrins or starch derivatives or Shellac. The shirring solution has also occasionally included an additive facilitating the subsequent peeling of the casing (e.g., carboxymethyl-cellulose). It can also include a cellulose enzyme in order to remove the casing in skinless sausages (EP 1101406).

The additive or additive composition is generally sprayed on at the start of the shirring process by means of a nozzle located at the end of the sleeve penetrating and inflating the cellulose tube coming from the reel. The friction between the casing and the sleeve is thus reduced from the first moment of contact.

Based on the needs of the state of the art, the inventor of the present application has developed a composition for addition during the pre-existing shirring step, capable of conferring the casing with a high capacity to cling to the meat paste or product stuffed therein on its own.

Said composition comprises at least one heat curable polycationic resinous component, a polyolic component and water.

The moment of converting the smooth casing into a shirred casing is the most suitable casing production step for the coating, since in said process the continuous smooth casing is segmented and impregnated with various previously mentioned functional liquid compositions. However, for a heat curable resin this involves the drawback that there are no subsequent steps after shirring in which the heat necessary for curing of resin is applied, and in the case of having to add them, the starting economic principle would again be violated.

However, the experiments carried out by the author of the present invention has surprisingly and expectedly allowed obtaining a result where the resin, incorporated in the casing together with the rest of shirring additives, and without the need of heat curing, is capable of anchoring to the casing, thus overcoming the preconceptions established in this respect in the state of the art, since it has never occurred to the person skilled in the art to add an additive to a shirring composition which according to the existing knowledge can only be anchored to the casing by heat curing, since it would have run the risk of the folds sticking together making the subsequent casing extension impossible.

The casings impregnated with said shirring composition, in the absence of heat curing, cling, once stuffed, excellently to the surface of the meat mass that they contain and have an excellent performance in terms of the cooking and/or drying processes to which they are subjected, in turn assuring food safety.

The application of coating composition during shirring, making up a pre-existing part of the process, configures a qualitative technical advantage since it prevents the need of using other conventional methods such as the bubble or viscose method which are much more expensive and have the previously mentioned drawbacks.

Furthermore, another surprising fact derived from using this composition is that, despite the anchoring of the resin on the casing, the latter is not stuck to itself in the folds of the stick, as could happen after an inherent heat curing process of the resin such as that used in the previous technique as a result of the bubble method. In contrast, the sticks unfold perfectly during the stuffing process without causing any casing defect.

Finally, another important advantage derived from using the composition of the present invention is that the casings treated with the composition of the invention surprisingly have a perfect performance under unnatural processing conditions in their application on certain meat products stuffed in low calibers, which allows competition where natural casings of animal intestines and collagen-based casings are the only alternative to date.

This unexpected fact entails a great competitive advantage, since on one hand, the composition and method of the invention allows economically dealing with a greater number of calibers (especially low calibers) for those applications in which the meat casing cling is essential, and on the other hand, the resulting casings allow shortening some processing cycles of the stuffed products for which they may be intended, although these cycles are more aggressive, thus increasing the product profitability.

OBJECT OF THE INVENTION

Figure 1:
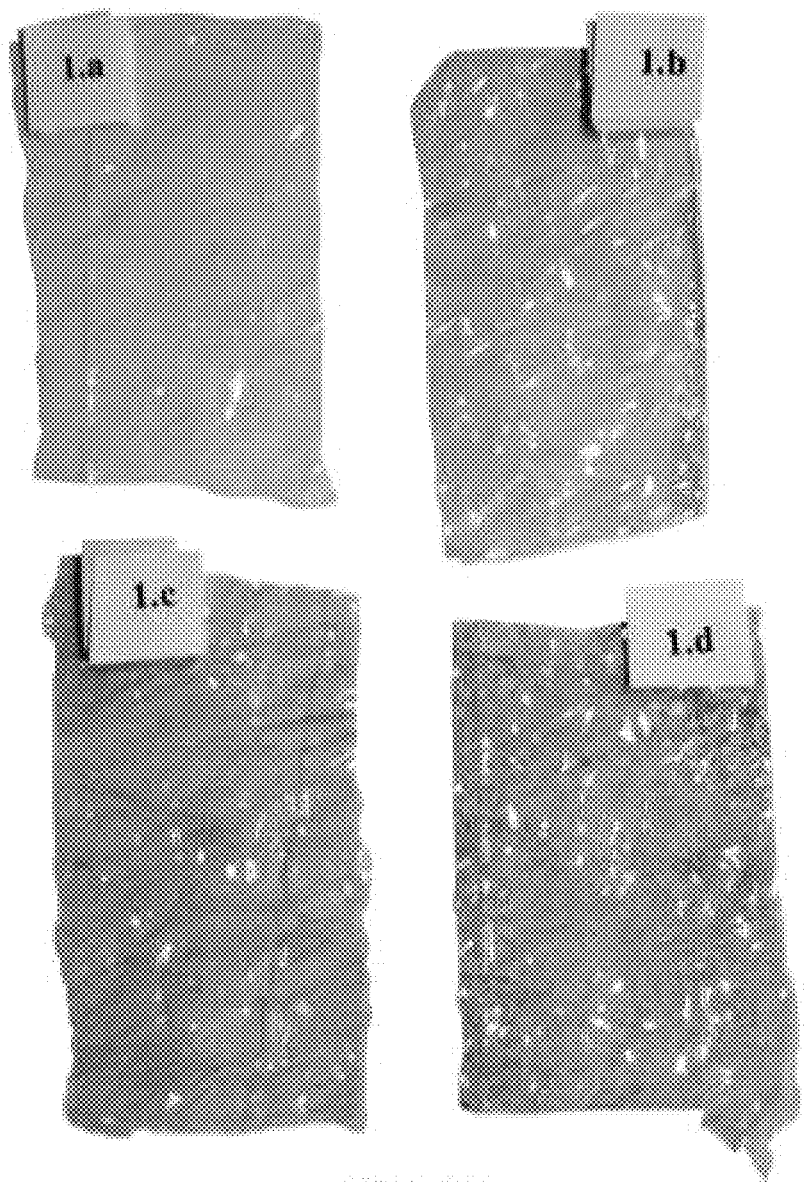
FIG. 1 shows the staining of the heat curable polycationic resin present on the inner surface of a cellulose casing with Coomassie blue. (1.a) Without coating, (1.b) coating by means of viscose injection, (1.c) coating by means of bubble method and (1.d) coating by means of adding the composition of the invention in shirring.

The main object of the present invention is a composition for use during the shirring of artificial casings which allows conferring the casing a high capacity to cling to the meat paste stuffed therein.

Another object of the present invention is an artificial casing impregnated with the shirring composition of the invention.

Another object of the invention is a meat product stuffed in an artificial casing impregnated with the composition of the invention.

Another object of the invention is a method for impregnating an artificial casing with the shirring composition of the present invention.

Finally, another object of the invention is the shirred casing obtained by the method of the invention.

DESCRIPTION OF THE INVENTION

Based on the needs of the state of the art, the author of the present invention have sought to develop a composition capable of conferring the artificial casings a high capacity to cling to the meat paste or product stuffed therein, eliminating the complicated use of the bubble commonly used for applying additives providing the casing meat cling effect, but without modifying the rest of the processes leading to the manufacture of finished cellulose casing or tube for the purpose of not introducing technological risks nor new cost elements.

To cover these needs, a main aspect of the invention contemplates a shirring composition for shirring artificial casings comprising at least one heat curable polycationic resinous component, a polyolic component and water, wherein the water activity (aw) index has a value greater than or equal to 0.70.

In the present invention, a "shirring composition" is defined as that additive composition for spraying the casing in shirring step.

Likewise, "shirring step" is defined as the step in which the casing is sprayed and folded over itself to form sticks. The casing is then packed and sold among meat producers who receive same in a ready-to-stuff form.

"Artificial casings" are defined as artificial coverings for stuffed products, either cellulose casings, reinforced or non-reinforced casings, as well as plastic casings and, by extension, coverings made of other materials such as proteins and other polysaccharides. In a preferred embodiment, the artificial casing is a cellulose casing.

"Heat curable polycationic resinous component" is understood as a polyamide water dispersible synthetic cationic polymer of polyamide-, polyamidoamine-, polyethyleneimine-, vinylamine- or N-vinylformamide-type, capable of passing to a crosslinked and heat stable solid state, in principle, by means of heat application.

In a particular embodiment, the heat curable polycationic resinous component present in the composition of the invention is in a proportion comprised between the 0.01 and 15% by weight with respect to the total weight of the composition.

In another particular embodiment, the heat curable polycationic resinous component comprises a mixture of two or more heat curable polycationic resins.

In preferred embodiments, the selected heat curable polycationic resins belong to the group of those obtained from condensing epichlorohydrin with a polyamide or a polyamidoamine derived from the polymeric reaction between a polyalkylene-polyamine and dicarboxylic acids, preferably saturated aliphatic dicarboxylic acids of between 3 and 8 carbon atoms, such as malonic acid, succinic acid, glutaric acid, adipic acid, as well as diglycolic acid. Among the polyalkylene polyamines used are polyethylene-polyamines, polypropylene-polyamines and polybutylene-polyamines. A preferred cationic resin can be, for example, the reaction product between epichlorohydrin and a polyamide formed by the reaction of diethylene-triamine (deta) and adipic acid, glutaric acid or succinic acid. Other preferred polycationic resins can also be those belonging to the group of polyethylene-imines and their products of condensation with epichlorohydrin. These resins are easily dispersible in water, therefore depending on the richness of the resin dispersion, the shirring composition of the invention can be contemplated with the necessary amount of water.

In the composition of the invention, the polyolic component content is dependent on the water and resin content thereof. In a particular embodiment, the polyolic component is present in a proportion comprised between 18 and 65% by weight with respect to the total weight of the composition, preferably between 40 and 60%.

The proportion of the polyolic component content in the present shirring composition is much greater than that of the compositions used for the resinous coatings applied by means of the bubble method, in which the proportion of water is much higher. The polyolic component, in addition to being a lubricant, acts as a retarder delaying water intake by the casing, which is extraordinarily hygroscopic, particularly in the case of cellulose. A quick wall hydration increases the cling between the sleeve and the casing which obstructs the sliding thereof of the casing during shirring. The presence of polyolic component reduces water activity (aw) of the composition, making water less available for hydrating the wall of the casing.

In a preferred embodiment of the present invention, the polyolic component used in the composition is glycerol, although other polyols which include, by way of example but without limitaton to same, propylene glycol, sorbitol or triethylene glycol, which can be combined with one another and with glycerol, can be used.

In a preferred embodiment, the water activity caused by the polyol/water mixture for attaining the optimum effects of the resin is at a value comprised between 0.70 and 0.95, and more preferably in a range comprised between 0.82 and 0.92.

On the other hand, the pH of the composition is set to a specific value for the purpose of modulating the degree of meat casing cling, the preferred range being 7 to 10, by means of an alkaline metal hyroxide preferably NaOH, or a buffer solution.

In a particular embodiment, the shirring composition of the present invention can include other additional components or additives capable of providing various functionalities. These additives are selected from proteins, groups of food grade substances acting as lubricant, emulsifier, moisturizer, antioxidant and preservative, bactericide, fungicide or bacterial and fungal growth inhibitor, flavoring, colorant, agents favoring peeling, inorganic or organic metal alkalis and their salts for pH adjustment and combinations thereof (examples of these additives can be found in patents CA 1325131; ES2076904 A1; US2004062888 (A1); U.S. Pat. Nos. 7,833,594; 5,928,738 (A)).

In a preferred embodiment, the additional components can be present up to 10% by weight with respect to the total weight of the composition.

Another main aspect of the present invention contemplates a shirred artificial casing impregnated with the shirring composition of the invention.

In a preferred embodiment of the invention, the impregnation of the artificial casing is performed on the inner surface. The invention also contemplates that the impregnation can be performed on the outer face; in this case the casing is preferably turned over before use.

In preferred embodiments, given that the characteristics of the composition of the invention allow the resins to solidify without needing to apply a heating step, the artificial casing of the invention has anchored heat curable polycationic resins which are not cured by heat.

Advantageously, despite of the anchoring of the resin on the casing, the latter is not stuck to itself in the folds of the stick, as could happen after an inherent heat curing process of the resin such as that used in the previous technique as a result of the bubble method. In contrast, the sticks unfold perfectly during the stuffing process without causing any casing defect.

The total content of the resinous component with respect to the total weight of the composition can range between 0.01% and 15%, which is necessary so that, once the casing is sprayed, a ratio by weight of the resin with respect to the dry weight of the casing of between 0.016% and 1.199% is achieved, and more preferably between 0.02% and 0.96%; and the calculation thereof can be carried out experimentally by any person skilled in the art, depending on the type and characteristics of the spraying and shirring device of the shirring machine, as well as on the rheological parameters of the final composition and the dimensions of the casing; such that in a preferred embodiment, the average amount of resin deposited on the surface of the casing is at least 0.005 mg/dm2, preferably between 0.04 mg/dm2 and 3.00 mg/dm2, more preferably between 0.05 mg/dm2 and 2.40 mg/dm2 and particularly between 0.1 mg/dm2 and 1 mg/dm2; whereby excellent results are obtained.

By means of using a staining reagent (Coomassie blue) it is confirmed that the distribution of the coating is not perfectly homogenous although it is distributed on the entire surface of the casing, such that it translates into a visually recognizable pattern of color which is identified with the helical pattern of the folding lines of the casing upon being shirred (FIG. 1; 1.d). This allows clearly differentiating whether the resin was applied before the shirring process, or at the start thereof as described, which entails a commercial advantage by being able to identify the casing with the process. It results in a surprising fact that, despite the fact that the distribution no not completely uniform and homogenous, the meat cling performance is as optimum as that provided by the coatings made by conventional methods.

Another main aspect of the invention contemplates a meat product stuffed in an artificial casing impregnated with the composition of the present invention.

In the present invention, "meat product" is defined as any food product which contains meat in its composition and which is formed inside a food casing or covering.

Another main aspect of the invention contemplates a method for impregnation an artificial casing with a shirring composition comprising the following steps:
 a) obtaining the shirring composition defined in the present invention,
 b) spraying the casing during the shirring process thereof with the composition obtained in a).

The method of the invention allows economically dealing with greater number of calibers (especially low calibers, low calibers being understood as those less than 36 mm) for those applications in which the meat casing cling is essential, and on the other hand, the resulting casings allow shortening some processing cycles of the stuffed products for which they may be intended, although these cycles are more aggressive, thus increasing the product profitability.

Therefore, a particular embodiment of the method of the invention starts from a reel of casing of a caliber less than 36, preferably comprised between 12 and 36 mm. Said casing is placed again in the unwinder of the shirring machine. At the start of the shirring operation, the cellulose tube which is still flattened, is re-opened by introducing therein the distal end of the sleeve, from where it will be sprayed internally with the shirring solution as the casing moves forward towards the take-up rollers.

Given that the resins solidify without needing an additional heating step once the shirring composition is completely absorbed, in preferred embodiments, the casing in the form of shirred sticks is not subjected to an additional curing heat treatment.

Nevertheless, optionally, after step c), the casing already shirred (sticks) and treated with the composition of the invention can be subjected to a tempering period lasting between 5 minutes and 1 hour at temperature of between 70 and 120° C., or between 12 h and 5 days at temperature of between 30° C. and 70° C. and more preferably at 35° C. for 3 days and particularly at 40° C. for 24 h. The casing thus treated increases bursting strength slightly, reducing elongation at the same time.

The shirred casing obtained by the method of the invention is then sent to a meat producer, where it may be stuffed with a meat composition in order to obtain a meat product. Subsequently the stuffed products are processed in any of the conventional manners.

The product obtained by means of the method of the invention has no unacceptable fat separation under the casing. Likewise, by means of a manual peeling operation it is confirmed that the casing has a suitable cling on the entire surface of the meat contacting same.

EXAMPLES

Example I

Comparison of the Performance of a Cellulose Casing Obtained by Means of the Method of the Invention and Those Obtained by Mixing Viscose with a Resin Before Extrusion or by Applying Resin with a Bubble This test was performed to compare the meat cling behavior of those cellulose casings impregnated by means of the method of the invention using a heat curable polycationic resin in shirring liquid, with or without additional heat treatment, with respect to the conventional alternative of obtaining "cured resin" by heat, both in the case of the resins injected in viscose before extrusion and in the case of resins applied by means of the bubble method. The heat curable polycationic resin used was provided by the Ashland company marketed under the name Kymene G3-X-CEL, with a dry matter (basically resinous component) content of 16.1%. Post-manufacturing steps were introduced in the manufacture of said polycationic resin to remove AOX consisting of a caustic treatment followed by microbial dehalogenation, converting DCP and CPD into $CO_2$ and salt, using to that end a mixture of microorganisms isolated from soil which carry out this dehalogenation such as *Arthrobacter histidinolovorans* and *Agrobacterium radiobacter*, as described in patents U.S. Pat. No. 5,972,691 and WO96/40967. The resin concentration in the impregnation liquid was the same in the bubble method and in that of the invention. In the method of viscose injection, 8% resin solution was introduced and, where appropriate, 0.1% protein was introduced with respect to the cellulose content of the casing. In order to assure the curing of the resin applied by means of the method of the invention, some of the impregnated sticks were subjected to a heat hardening process at 120° C. for a period of 60 minutes.

How the presence of proteins influenced the mixture with resin was also to be determined. In this and the other examples, a liquid shirring solution made up 50% water and another 50% glycerol called softener was used as the control. Shirring compositions with protein and without resin were also used.

The different compositions can be seen in Table I, identified with a series of references which can be used for checking the results of the application in stuffing and processing selected meat product (Table IV). The pH of all the formulations was set at 7.0.

TABLE I

Composition of the shirring additives the amounts of which are expressed in grams

| Reference | Additive | Water | G3-XCEL | Soy protein Supro 248 | Pea protein | Plasma protein | Glycerol |
|---|---|---|---|---|---|---|---|
| M10465 | Resin | 89.0 | 186 | | | | 225 |
| M10466 | Resin - Soy | 88.2 | 186 | 0.83 | | | 225 |
| M10467 | Resin - Pea | 89.0 | 186 | | 0.83 | | 225 |
| M10468 | Resin - Plasma | 89.0 | 186 | | | 0.83 | 225 |

TABLE I-continued

Composition of the shirring additives the amounts of which are expressed in grams

| Reference | Additive | Water | G3-XCEL | Soy protein Supro 248 | Pea protein | Plasma protein | Glycerol |
|---|---|---|---|---|---|---|---|
| M10469 | Soy | 274.2 | | 0.83 | | | 225 |
| M10470 | Pea | 275.0 | | | 0.83 | | 225 |
| M10471 | Plasma | 275.0 | | | | 0.83 | 225 |

Results:

Table IV shows the results of stuffing a meat product prepared according to the formulation of Table II and subjected to the processing cycle described in Table III:

TABLE II

Formulation of the meat product

| INGREDIENTS | % |
|---|---|
| SHOULDER | 50 |
| BACON | 20 |
| RIND EMULSION | 4 |
| 1:3 TEXTURED SOY | 12 |
| WATER | 6 |
| SOY ISOLATE | 1 |
| CASEINATE | 0 |
| SALT | 1.8 |
| NITRITE | 0.02 |
| GARLIC | 0.5 |
| COLORANT | 0.02 |
| PAPRIKA | 2 |
| DEXTROSE | 1 |
| OREGANO | 0 |
| CUMIN | 0 |
| ASCORBATE | 0.05 |

TABLE III

Processing Conditions of the Meat product

| NAME OF STEP | TEMPERATURE, °C. | TIME, minutes | R.H. % |
|---|---|---|---|
| DRYING | 65° | 30 | <10% |
| FLAMING | 65° | 5 | 40-50% |
| SMOKING | 65° | 15 | 40-50% |
| DRYING2 | 70° | 5 | <10% |
| COOKING | 80° | 80 | >90% |

The degree of fat seepage from the meat emulsion subjected to the processing cycle of the stuffed product described in Table III as well as the degree of cling of the casing to the meat emulsion was evaluated.

TABLE IV

Comparison of stuffing results. References with the symbol HH ("Heat Hardening") are those subjected to heat curing

| REFERENCE | KEY | STUFFING DIAMETER PIECE 1, (mm) | STUFFING DIAMETER PIECE 2 (mm) | FAT SEEPAGE | DEGREE OF CLING |
|---|---|---|---|---|---|
| M10461 | Injection of resin into viscose | 53.3 | 52.5/49.5 | (4) | (0) |
| M10462 | Injection of resin-SOY into viscose | 53.5 | 52.5/49 | (2) | (1) |
| M10463 | Injection of resin-PLASMA into viscose | 50 | 50/48 | (3) | (1) |
| M10464 | CONTROL Softener | 51.5/49 | 48/48 | (4) | (0) |
| M10465 | Resin in shirring | 50/49 | 48.5/49 | (0) | (4) |
| M10465 HH | HH Resin (120° C./60 min) | 50/49 | 49/48.5 | (0) | (4) |
| M10466 | Resin-Soy in shirring | 51/48.5 | 49.5/49.5 | (0) | (4) |
| M10466 HH | HH Resin-Soy (120° C./60 min) | 51/49 | 49.5/48.5 | (0) | (4) |
| M10467 | Resin-Pea in shirring | 48.5/47.5 | 50.5/49.5 | (0) | (4) |
| M10467 HH | HH resin-Pea 120° C./60 min | 51.5/50 | 50/49 | (0) | (4) |
| M10468 | Resin-plasma in shirring | 49.5/49 | 52/49 | (0) | (4) |
| M10468 HH | HH resin-plasma 120° C./60 min | 49/48 | 50/49 | (0) | (4) |
| M10469 | Soy prot. in shirring | 51/48.5 | 48.5/48 | (4) | (0) |
| M10470 | Pea prot. in shirring | 48.5/48.5 | 49/49 | (4) | (0) |

TABLE IV-continued

Comparison of stuffing results. References with the symbol HH ("Heat Hardening") are those subjected to heat curing

| REFERENCE | KEY | STUFFING DIAMETER PIECE 1, (mm) | STUFFING DIAMETER PIECE 2 (mm) | FAT SEEPAGE | DEGREE OF CLING |
|---|---|---|---|---|---|
| M10471 | Plasma prot. in shirring | 48.5/48.5 | 50/50.5 | (4) | (0) |
| M 90937 (Caliber 45) | Resin-Soy in bubble | 44/43.5 | 44.5/43.5 | (0) | (2) |

Keys to the results:
Fat seepage:
(0) = nil
(1) = low
(2) = moderate
(3) = high
(4) = massive
degree of cling:
(0) = nil
(1) = moderate
(2) = notable
(3) = high
(4) = very high
(5) = excessive When the tables of results show two stuffing diameters, the first one corresponds to the stuffing diameter measured in the lower pole of the hung stuffed piece, and the second one corresponds to the stuffing diameter measured in the upper pole of the hung stuffed piece.

On one hand, the results showed that the presence of resin applied by means of the composition and method of the invention provided the casing with a sufficient capacity to grip to the meat to prevent fat seepage during stuffed product processing, the same as when the bubble solution is applied, whereas the addition of the resin by injection into the viscose did not prevent excessive fat seepage during said processing, even though fat seepage was less when said injection also contained protein. It was also concluded that the presence of proteins along with the resin in the shirring composition was irrelevant in terms of conferring said capacity and that, in any case, the curing of the resin does not have a greater effect with respect to the direct application thereof without heat curing. This indicates that it is not necessary to introduce a new heating step after shirring, which fulfills one of the objectives of the invention. Finally, it was observed that the proteins alone applied by means of the method of the invention were also not efficient in terms of preventing fat seepage, possibly due to not having been anchored to the wall of the casing.

Example II

Effect of Varying the Amount of Resin by Dm2 in the Inner Surface of the Casing

This example was performed using a set of shirring impregnation liquid compositions which exclusively include glycerol and propylene glycol as polyols, resin and water, though the amounts of resin and water were varied. The percentage of the resin solution (containing the heat curable polycationic resinous component) in the compositions ranged between 1% and 37% and in this case heat hardening was not performed. Since the same amount of shirring additive was added to all the samples, the distribution of resin on the inner surface of the casing ranged between 0.08 mg/dm$^2$ and 2.78 mg/dm$^2$ (Table V)

TABLE V

Formulations of shirring additive. Amount of ingredients expressed in percentage by weight

| Additives | Reference | mg of resin/ dm$^2$ of casing | % Glycerin | % Propylene Glycol | % G3-XCEL | % Water |
|---|---|---|---|---|---|---|
| Control | M10484 | 0 | 40 | 10 | | 50 |
| 0 | M10485 | 2.78 | 40 | 10 | 37 | 13 |
| 1 | M10486 | 2.25 | 40 | 10 | 30 | 20 |
| 2 | M10487 | 1.88 | 40 | 10 | 25 | 25 |
| 3 | M10488 | 1.5 | 40 | 10 | 20 | 30 |
| 4 | M10489 | 1.13 | 40 | 10 | 15 | 35 |
| 5 | M10490 | 0.75 | 40 | 10 | 10 | 40 |
| 6 | M10491 | 0.38 | 40 | 10 | 5 | 45 |
| 7 | M10492 | 0.23 | 40 | 10 | 3 | 47 |
| 8 | M10493 | 0.08 | 40 | 10 | 1 | 49 |

The casings coated with the different formulations were stuffed with a meat paste prepared according to the recipe of Table II, and the stuffed product was processed according to the cycle described in Table III.

The results of the stuffed product processing are shown in Table VI.

TABLE VI

Results of stuffed product processing in casings with various resin concentrations.

| REFERENCE | ADDITIVE | STUFFING DIAMETER PIECE 1, mm | STUFFING DIAMETER PIECE 2, mm | FAT SEEPAGE | DEGREE OF CLING |
|---|---|---|---|---|---|
| M10484 | Control | 55/55 | 54/54 | (4) | (0) |
| M10485 | 0 | 53/52.5 | 53.5/53 | (0) | (4) |
| M10486 | 1 | 52/51 | 52/51.5 | (0) | (3) |
| M10487 | 2 | 51.5/51.5 | 52/52 | (0) | (2) |
| M10488 | 3 | 52/52 | 52.5/52 | (0) | (2) |
| M10489 | 4 | 54/53 | 53/53.5 | (0) | (2) |
| M10490 | 5 | 52/52 | 51.5/51.5 | (0) | (2) |
| M10491 | 6 | 51.5/52 | 54/52.5 | (0) | (2) |
| M10492 | 7 | 51.5/52 | 52.5/52 | (1) | (2) |
| M10493 | 8 | 51.5/52 | 52.5/52 | (2) | (1) |

Keys to the results:
Fat seepage:
(0) = nil
(1) = low
(2) = moderate
(3) = high
(4) = massive
Degree of cling:
(0) = nil
(1) = moderate
(2) = notable
(3) = high
(4) = very high
(5) = excessive It is observed in Table VI that generally the degree of cling increases with the amount of resin present in the shirring additive. The degree of cling starts to drop at resin solution concentrations less than 1% in the shirring composition, however, at such low concentrations the presence of polycationic resins allows reducing fat seepage with respect to the resin-free control samples.

Example III

Comparative Tests with Respect to Other Heat Curable Resins

Based on the shirring composition of the invention, the effects of several types of both cationic and anionic heat curable resins were tested. The proportions of the components of each formulation are shown in Table VII.

TABLE VII

Compositions with different types of heat curable resins. Amount of the different ingredients expressed in percentage by weight

| Ingredient | 6% G3-XCEL | 3% G3-Xcel | 1.5% G3-XCEL | 6% Polycup | 6% anionic luredur | 6% lupamin |
|---|---|---|---|---|---|---|
| % Glycerol | 50 | 50 | 50 | 50 | 50 | 50 |
| % G3-XCEL (Cationic) | 6.0 | 3.0 | 1.5 | | | |
| % POLYCUP 172 EU (Cationic) (Ashland) | | | | 6.0 | | |
| % LUREDUR PR8276X (Anionic) (BASF) | | | | | 6.0 | |
| % Lupamin 9095 (Cationic) (BASF) | | | | | | 6.0 |
| % WATER | 44 | 47 | 48.5 | 44 | 44 | 44 |

The casings impregnated with the shirring solutions of Table VII were stuffed with a meat paste prepared according to the recipe of Table II, for which the % of soy isolate is increased from 1 to 2% and the % of casein is increased from 0 to 1%, and the casings were subjected to the processing cycle described in Table III. This new formula caused the stuffed product to be less inclined to release fat during processing than in Example I. The results obtained are shown in Table VIII.

TABLE VIII

Results of stuffed product processing in casings with various heat curable resins

| SAMPLE | KEY | STUFFING DIAMETER PIECE 1, (mm) | STUFFING DIAMETER PIECE 2, (mm) | FAT SEEPAGE | DEGREE OF CLING |
|---|---|---|---|---|---|
| M10505 | 6% CATIONIC G3-XCEL | 55/54.5 | 56/55 | (0) | (3) |
| M10505 HH | 6% CATIONIC G3-XCEL + 24 h at 40° C. | 56/55 | 55/54 | (0) | (3) |
| M10507 | 1% CATIONIC G3-XCEL | 55/54 | 55.5/55 | (1) | (1) |
| M10508 | CONTROL SOFTENER | 53.5/53.5 | 55/53.5 | (4) | (0) |
| M10509 | 6% CATIONIC POLYCUP | 56/54.5 | 55/54 | (2) | (1) |
| M10510 | 6% ANIONIC LUREDUR | 54.5/53 | 56/54 | (4) | (0) |
| M10512 | 6% CATIONIC LUPAMIN | 56/55 | 55.5/55 | (3) | (1) |

Keys to the results:
Fat seepage:
(0) = nil
(1) = low
(2) = moderate
(3) = high
(4) = massive
Degree of cling:
(0) = nil
(1) = moderate
(2) = notable
(3) = high
(4) = very high
(5) = excessive As can be seen in Table VIII, the best result was obtained with resin G3-XCEL, but also there was a slight effect for the case of the rest of the polycationic resins.

Example IV

Performance of a Cellulose Casing Treated with the Composition of the Invention when it is Applied to a Conventional Low Caliber Product Stuffed Commonly in Collagen or Natural Casing (Lapcheong)

The performance of a low caliber cellulose casing to which the composition of the invention was applied during the shirring method was evaluated by means of this embodiment. For this embodiment, three different resin concentrations as described in Table IX were tested on a caliber 13 EUR cellulose casing equivalent to that used for stuffing a conventional low caliber and high fat content product, made commonly of natural casing or collagen casing. Said product called Lapcheong in its country of origin (China) has a typical meat composition described in Table X.

TABLE IX

Formulations of the shirring additive. Amount of the ingredients expressed in grams.

| | Shirring additive | | |
|---|---|---|---|
| Ingredient | 9.5% G3-XCEL | 5% G3-Xcel | 2.5% G3-XCEL |
| % Glycerol | 50 | 50 | 50 |
| % G3-XCEL | 9.5 | 5 | 2.5 |
| % WATER | 40.5 | 45 | 47.5 |

TABLE X

Quantitative composition of the meat product, Lapcheong.

| INGREDIENTS | % |
|---|---|
| Shoulder | 55.32 |
| Bacon | 25.15 |
| White wine | 3.22 |
| Sugar | 10.06 |
| Lactose | 3.77 |
| Salt | 1.51 |
| SAPP* | 0.30 |
| STPP** | 0.20 |
| Pepper | 0.30 |
| Glutamate | 0.10 |
| Ascorbic acid | 0.05 |
| Nitrite | 0.02 |
| Colorant | 0.02 |

*Sodium acid pyrophosphate
**Basic sodium tripolyphosphate

The conventional processing for such product consists of three days of oven drying (see the cycle in Table XI).

TABLE XI

Conventional conditions for Lapcheong maturation.
PRODUCT: TRADITIONAL-LAPCHEONG

| NAME OF STEP | TIME, hours | TEMPERATURE, °C. | R.H. % |
|---|---|---|---|
| DRYING | 24 | 60 | 50 |
| DRYING | 24 | 55 | 35 |
| DRYING | 24 | 50 | 20 |

The results showed (see Table XII) that the casings treated with the solution of the invention complemented the meat paste perfectly during the reduction experienced in the drying process, providing a perfectly acceptable end product appearance without any separation point, whereas the casings treated with the usual shirring solution were completely separated from the meat when the process ended.

in Table XIII) which involve a significant reduction in stuffed product preparation time was to be confirmed in the next embodiment. The same meat composition described in Table X was used.

TABLE XIII

Quick Lapcheong maturation conditions.
PRODUCT: LAPCHEONG SHORT CYCLE

| NAME OF STEP | TIME, hours | TEMPERATURE, °C. | R.H. % |
|---|---|---|---|
| RELATIVE HUMIDITY CONDITIONS 1 | 1 | 60° | 50-60 |
| RELATIVE HUMIDITY CONDITIONS 2 | 1 | 70° | 40-50 |
| DRYING | 1 | 75° | 0 |
| DRYING | 0.5 | 80° | 0 |
| RELATIVE HUMIDITY CONDITIONS 3 | 0.5 | 85° | 80-95 |
| DRYING | 0.5 | 85° | 0 |

TABLE XII

Comparison of the performance of a) the casings with standard shirring solutions (Easy Peeling and Softener) and b) casings of the invention (the rest) during the processing of a traditional Lapcheong.

| PROCESS | REFERENCE | ADDITIVE | mg of resin/dm2 of casing | INITIAL FLAT WIDTH OF CASING, mm | INITIAL WEIGHT, g | FINAL WEIGHT, g | REDUCTION, % | INITIAL Ø, mm | Result of complementing casing with stuffed product |
|---|---|---|---|---|---|---|---|---|---|
| CONVENTIONAL OVEN | 13 EUR | Easy peeling | 0.0 | 22 | 725 | 420 | 42.07 | 15.3 | (0) |
| CONVENTIONAL OVEN | 13 EUR-M10565 | Softener control | 0.0 | 21.6 | 725 | 415 | 42.76 | 15.2 | (0) |
| CONVENTIONAL OVEN | M10566 | Resin-9.5% | 0.46 | 21 | 730 | 420 | 42.47 | 15.3 | (1) |
| CONVENTIONAL OVEN | M10567 | Resin-5% | 0.24 | 21.5 | 730 | 420 | 42.47 | 15.3 | (1) |
| CONVENTIONAL OVEN | M10568 | Resin-2.5% | 0.12 | 21.5 | 730 | 420 | 42.47 | 15.4 | (1) |

Keys: Complementing casing with the stuffed product:
(0) = Nil
(1) = Correct

Example V

Performance of a Cellulose Casing Treated with the Composition of the Invention when it is Applied to a Lapcheong Prepared by Means of a Short Intense Cycle The performance of the casing in more aggressive processing conditions and in a much shorter cycle than the conventional cycle (the characteristics of which can be seen in Table XIII) which involve a significant reduction in stuffed product preparation time was to be confirmed in the next embodiment.

Due to the fact that even though the present processing cycle is shorter than that shown in Example IV, it was more intense in terms of temperatures, so a greater tendency of fat seepage from the meat product would be expected, and therefore the casing is further required to have good cling to the meat to prevent the formation of the pockets of fat. Surprisingly, the casings prepared with resin by means of the composition and method of the invention showed excellent cling to the meat emulsion, preventing fat seepage during stuffed product processing.

TABLE XIV

Comparison of the performance of a) the casings with standard shirring solutions (Easy Peeling and softener) and b) casings of the invention (the rest) after processing a Lapcheong prepared by means of a short intense cycle

| PROCESS | REFERENCE | ADDITIVE | mg of resin/dm2 of casing | INITIAL FLAT WIDTH OF CASING, mm | INITIAL WEIGHT, g | FINAL WEIGHT, g | REDUC. % | INITIAL Ø, mm | FAT SEEPAGE | DEGREE OF CLING |
|---|---|---|---|---|---|---|---|---|---|---|
| Short oven cycle | 13 EUR | Easy Peeling | 0.0 | 22 | 730 | 505 | 30.82 | 15.2 | (4) | (0) |
| Short oven cycle | 13 EUR-M10565 | SOFTENER | 0.0 | 21.6 | 730 | 500 | 31.51 | 15.5 | (3) | (0) |
| Short oven cycle | M10566 | Resin - 9.5% | 0.46 | 21 | 730 | 475 | 34.93 | 15.4 | (0) | (3) |
| Short oven cycle | M10567 | Resin - 5% | 0.24 | 21.5 | 730 | 475 | 34.93 | 15.4 | (0) | (3) |
| Short oven cycle | M10568 | Resin - 2.5% | 0.12 | 21.5 | 730 | 475 | 34.93 | 15.3 | (0) | (2) |

Keys to the results:
Fat seepage:
(0) = nil
(1) = low
(2) = moderate
(3) = high
(4) = massive
degree of cling:
(0) = nil
(1) = moderate
(2) = notable
(3) = high
(4) = very high
(5) = excessive The results show (see Table XIV) that the casings treated with the composition of the invention completely prevented fat seepage from the meat paste during the quick processing of Lapcheong.

Compared with Example IV, Example V shows that the casings of the invention allow performing a much shorter cycle than the conventional cycle without fat seepage from the stuffed product, unlike casings with the standard shirring composition, which do not allow this because they case a number of fat separations. This possible use of the casings of the invention in a much shorter alternative cycle entails a considerable advantage for stuffed product manufacturers.

Example VI

Variation of Water Activity of the Shirring Solution of the Invention

The analysis of the water activity ($a_w$) of the compositions having the best performance in shirring ranged between 0.84 and 0.91. Table XV shows various compositions of the invention with their corresponding water activity and their performance in the shirring operation.

TABLE XV

Shirring ability and ($a_w$) of different compositions of the invention.

| % Water | % Glycerol | % G3-XCEL | $a_w$ | SHIRRING ABILITY |
|---|---|---|---|---|
| 84 | 10 | 6 | 0.95 | The casing holds on to the sleeve. It has shirring difficulties. |
| 64 | 30 | 6 | 0.93 | The casing slightly holds on to the sleeve. It can be shirred with some difficulty. |
| 54 | 40 | 6 | 0.91 | OK |
| 44 | 50 | 6 | 0.84 | OK |

TABLE XV-continued

Shirring ability and ($a_w$) of different compositions of the invention.

| % Water | % Glycerol | % G3-XCEL | $a_w$ | SHIRRING ABILITY |
|---|---|---|---|---|
| 34 | 60 | 6 | 0.76 | The casing does not absorb the shirring additive well |

Example VII

Effect of Varying the pH of the Shirring Solution of the Invention on the Degree of Cling of the Casing to the Meat Product The pH of a shirring composition of the invention which consisted of an aqueous solution with 50% glycerol and 6% G3-XCEL, was set to a range of 1.0 to 13.0 in order to determine the effect of this parameter on the cling of the casing to the meat paste. The meat paste described in Example III, which was subjected to the processing cycle described in Table XVI, was used for that purpose. A casing shirred with softener was included as the negative control. The amount of resin added was 0.45 mg/dm2 in the rest of the cases. The results obtained are described in Table XVII.

TABLE XVI

Processing conditions of the meat product

| NAME OF STEP | TEMPERATURE, °C. | TIME, minutes | R.H. % |
|---|---|---|---|
| DRYING | 65° | 20 | <10% |
| FLAMING | 65° | 5 | 40-50% |
| SMOKING | 65° | 15 | 40-50% |
| DRYING2 | 70° | 5 | <10% |
| COOKING | 80° | 30 | >90% |

TABLE XVII

Results of stuffed product processing in casings shirred with additive of the invention set to different pH value.

| REFERENCE | ADDITIVE | INITIAL FLAT WIDTH OF CASING, mm | INITIAL WEIGHT, g | FINAL WEIGHT, g | REDUCTION, % | INITIAL Ø, mm | FAT SEEPAGE | DEGREE OF CLING |
|---|---|---|---|---|---|---|---|---|
| 21 EUR | SOFTENER | 30 | 1780 | 1470 | 17.4 | 21.4 | 4 | 0 |
| HC-1 | Resin at pH = 1 | 30 | 1775 | 1430 | 19.4 | 21.6 | 0 | 2 |
| HC-4 | Resin at pH = 4 | 30.4 | 1770 | 1430 | 19.2 | 21.8 | 0 | 2 |
| HC-8 | Resin at pH = 8 | 30 | 1770 | 1425 | 19.5 | 21.8 | 0 | 3 |
| HC-9 | Resin at pH = 9 | 30 | 1770 | 1420 | 19.8 | 21.8 | 0 | 4 |
| HC-10 | Resin at pH = 10 | 30 | 1775 | 1415 | 20.3 | 21.7 | 0 | 4 |
| HC-13 | Resin at pH = 13 | 30 | 1770 | 1425 | 19.5 | 21.5 | 0 | 3 |

Figure 2:
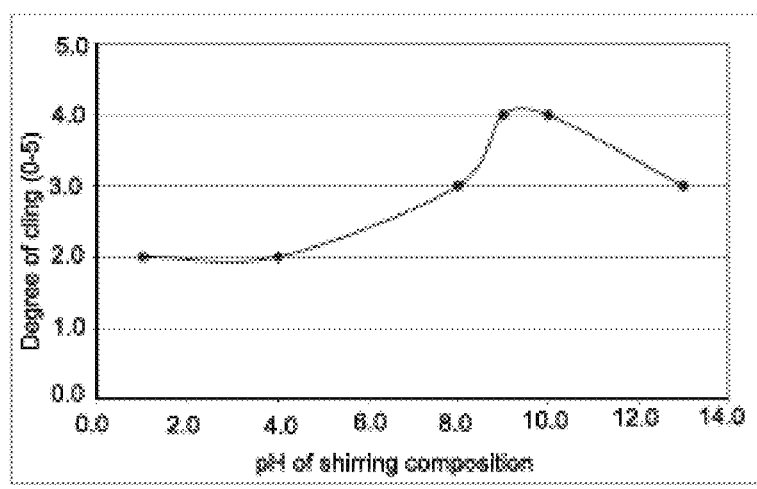
FIG. 2 shows the clinging capacity according to the pH of the composition of the invention.

Keys to the results:
Fat seepage:
(0) = nil
(1) = low
(2) = moderate
(3) = high
(4) = massive
Degree of cling:
(0) = nil
(1) = moderate
(2) = notable
(3) = high
(4) = very high
(5) = excessive Surprisingly the composition of the invention prevented fat seepage in the entire pH range studied. On the other hand, the degree of cling was modulated by the pH of the shirring composition, a maximum value of about pH=9-10 and a minimum value at acidic pHs being observed (FIG. 2). Therefore, by varying the pH of the composition the cling of the casing to the meat can be specifically adapted for each type of stuffed product.

Example VIII

Application of the Method of the Invention on Polyamide Casing

Tests were carried out to check the effect of the additive used in the preceding casings for increasing meat cling in a plastic casing.

The test was started with 2 Caliber 37 Betan printed samples (plastic polyamide casing), one of them shirred with softener and the other with the additive of the invention, made up of an aqueous solution with 50% glycerol and 6% G3-XCEL, to an amount of resin in the casing of 0.34 mg/dm2. A standard Bratwurst emulsion was stuffed therein in a VEMAG RUBBY-II stuffer with a caliber 37 twisting arm, and the sausages were cooked at 72° C. for 45 minutes. After cooking, the sausages were washed and after five minutes of rest, the sausages of both samples were peeled. An increase in the grip of the casing to the meat in the samples that had an additive with a high degree of cling was observed.

Example IX

Determination of the Distribution of the Heat Curable Polycationic Resin by Means of the Heat Curable Polycationic Resin Staining Technique To determine the distribution of the heat curable polycationic resin in a casing an aqueous solution of Coomassie blue with the following composition was used: 0.125% Coomassie blue (Merck), 50% methanol and 10% acetic acid. The method consisted of taking a casing sample of about 10 cm in length, cutting it longitudinally to open the tube and submerge the sample in the Coomassie blue solution for 10 s. It was then washed under running water for 20 s and dried between two filter papers. The entire method was carried out at room temperature. The areas which had heat curable polycationic resin appeared in blue, it being more intense when there was a larger amount of resin.

FIG. 1 shows the absence of staining for the case of a coating-free cellulose casing with a heat curable polycationic resin (1.a), complete and homogenous distribution for the case of injecting said resin in viscose (1.b), complete and homogenous distribution for the case of adding said resin by means of the bubble method (1.c) and complete and non-homogenous distribution for the case of adding said resin with the composition of the invention in the shirring process (1.d).

The invention claimed is:

1. A shirring composition for high meat cling of artificial casings comprising one heat curable polycationic resinous component, a polyolic component, inorganic or organic metal alkalis and their salts for pH adjustment and water, wherein the water activity ($a_w$) index has a value greater than or equal to 0.70, and the pH of the composition is between 7 and 10.

2. The shirring composition according to claim 1 further comprising an additive selected from the group consisting of proteins, food grade substances with lubricating action, emulsifier, moisturizer, antioxidant and preservative, bactericide, fungicide and fungal growth inhibitor, flavoring, colorant, and combinations thereof.

3. The shirring composition according to claim 1, characterized in that the heat curable polycationic resinous component is present in a proportion comprised between 0.01 and 15% by weight with respect to the total weight of the composition.

4. The shirring composition according to claim 1, characterized in that the heat curable polycationic resinous component comprises a mixture of two or more heat curable polycationic resins.

5. The shirring composition according to claim 1, wherein the heat curable polycationic resinous component is selected from the group consisting of resins derived from the polymeric reaction of epichlorohydrin and a polyamide, a polyethyleneimine, a polyamidoamine, and resins derived from the condensation of a polyalkylene-polyamine with dicarboxylic acids.

6. The shining composition according to claim 1, characterized in that the polyolic component is present in a proportion comprised between 18 and 65% by weight with respect to the total weight of the composition.

7. The shirring composition according to claim 1, characterized in that the polyolic component is glycerol or propylene glycol.

8. The shirring composition according to claim 1, characterized in that the polyolic component is a mixture of two or more polyols.

9. The shirring composition according to claim 1, characterized in that the $a_w$ has a value comprised between 0.70 and 0.95.

10. The shining composition according to claim 1, characterized in that the additional components can be present up to 10% by weight with respect to the total weight of the composition.

11. An artificial casing impregnated with the shirring composition of claim 1.

12. The artificial casing according to claim 11, characterized in that the distribution by weight of the resinous component on the surface of said casing is at least 0.005 mg/dm$^2$.

13. The artificial casing according to claim 12, characterized in that the distribution by weight of the resinous component on the surface of said casing is comprised between 0.04 and 3 mg/dm$^2$.

14. The artificial casing according to claim 11, characterized in that it is a cellulose casing.

15. A meat product stuffed in the artificial casing according to claim 11.

16. A method for impregnating an artificial casing with a shirring composition according to claim 1, comprising the following steps:
   a) obtaining a shirring composition according to claim 1, and
   b) spraying the casing during the shirring process thereof with the composition obtained in a).

17. The method according to claim 16, wherein after step b), the sprayed casing is subjected to a tempering period of between 5 minutes and 1 hour at temperature of between 70 and 120° C.

18. The method according to claim 16, wherein after step b), the sprayed casing is subjected to a tempering period of between 12 hours and 5 days at a temperature of between 30° C. and 70° C.

19. The method according to claim 16, wherein the casing used in b) is of a caliber less than 36 mm.

20. A shirred artificial casing obtained by the method of claim 16.

21. The composition according to claim 6, wherein the polyolic component is present in a proportion comprised between 40 and 60% by weight with respect to the total weight of the composition.

22. The composition according to claim 9, wherein the $a_w$ has a value comprised between 0.82 and 0.92.

23. The artificial casing according to claim 13, wherein the distribution by weight of the heat curable polycationic resinous component on the surface of said casing is comprised between 0.05 and 2.4 mg/dm$^2$.

24. The artificial casing according to claim 13, wherein the distribution by weight of the heat curable polycationic resinous component on the surface of said casing is comprised between 0.1 and 1 mg/dm$^2$.

25. The method according to claim 18, wherein after step b), the sprayed casing is subjected to a tempering period of three days at a temperature of between 35° C.

26. The method according to claim 18, wherein after step b), the sprayed casing is subjected to a tempering period of 24 hours at a temperature of between 40° C.

* * * * *